C. H. GENTH.
ELASTIC TIRE FOR WHEELS.
APPLICATION FILED NOV. 8, 1910.
1,159,760.
Patented Nov. 9, 1915.
2 SHEETS—SHEET 1.
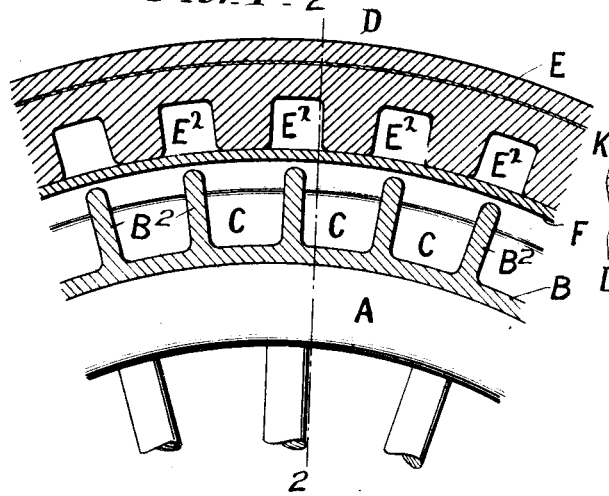
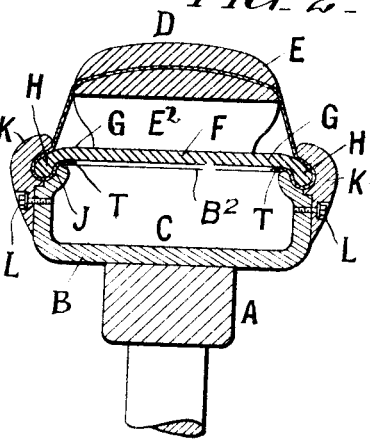
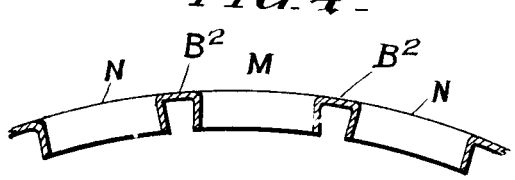
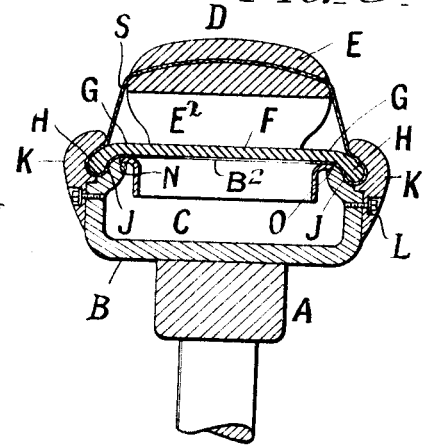
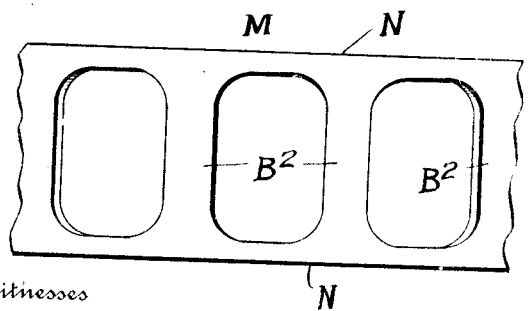

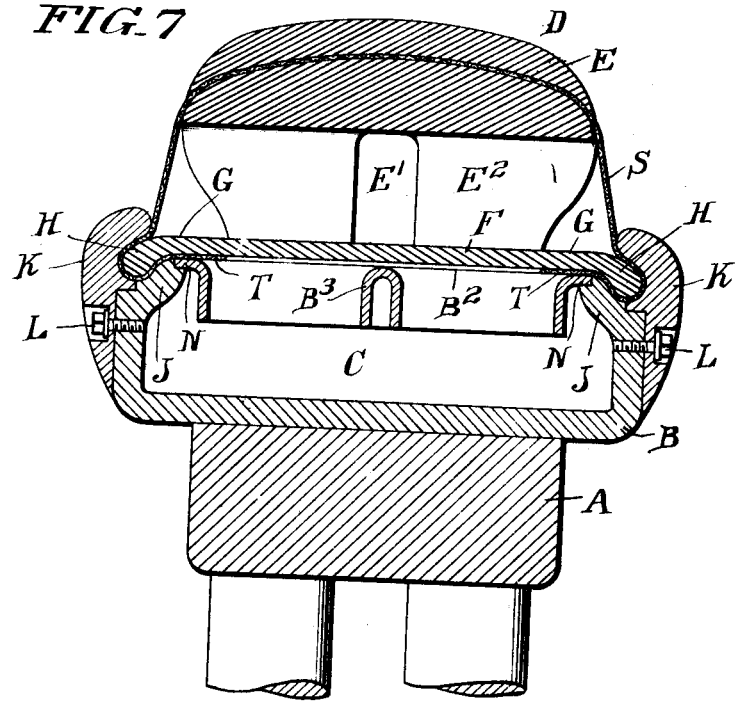
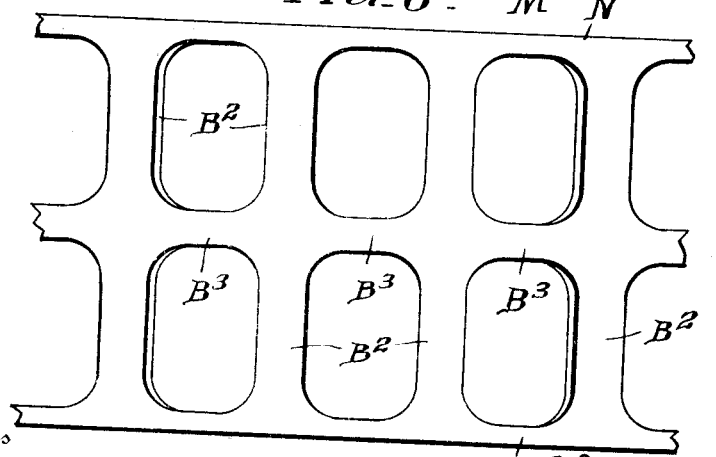

UNITED STATES PATENT OFFICE.

CHARLES HAHN GENTH, OF PHILADELPHIA, PENNSYLVANIA.

ELASTIC TIRE FOR WHEELS.

1,159,760.  Specification of Letters Patent.  Patented Nov. 9, 1915.

Application filed November 8, 1910. Serial No. 591,295.

*To all whom it may concern:*

Be it known that I, CHARLES H. GENTH, a citizen of the United States, and a resident of the city of Philadelphia, county of Philadelphia, State of Pennsylvania, have invented an Improvement in Elastic Tires for Wheels, of which the following is a specification.

My invention is intended to provide an elastic tire, suitable particularly for automobiles and other heavy vehicles, in place of the pneumatic tires now in use.

Part of the improvements relate particularly to an elastic tire in which the shoe-portion is provided with an internal pocket, adjacent to the inner side, closed by an elastic web, and the rim-portion, which supports such shoe-portion, has a recessed face provided with a rib, adjacent to the elastic web over the pocket of the shoe-portion, and adapted to receive the contact of said web when pressure is applied to the adjacent part of the shoe-portion. In my application Serial No. 523,232, filed October 18, 1909, I have shown and described a tire of this kind, in which the internal pocket in the shoe-portion is of continuous annular form, and the rib on the recessed face of the rim portion is also of annular form. According to the present invention, however, I provide the shoe-portion with a series of transverse pockets and the rim-portion with a series of corresponding transverse ribs.

My invention relates also to certain improvements in the construction of the shoe-portion of a wheel-tire and its combination with the rim-portion.

In the accompanying drawings, Figure 1 is a longitudinal vertical section of a wheel-tire embodying the invention in one form; Fig. 2 is a transverse sectional view of the same on the line 2—2 of Fig. 1; Fig. 3 is a view similar to Fig. 2 illustrating a modification; Fig. 4 is a longitudinal vertical sectional view of a part of the rib forming ring employed in the form of the invention shown in Fig. 3; Fig. 5 is a plan view of the same; Fig. 6 is a plan view similar to Fig. 5 showing another form of the rib forming ring; and Fig. 7 is a transverse section similar to Figs. 2 and 3 with the rib forming ring shown in Fig. 6.

A is a wheel-felly to which the tire is applied. The wheel proper may be of wood or metal and any construction desired.

Surrounding the perimeter of the felly A is a metal rim B of channel-shape in cross section providing an annular chamber C. Secured to the outer edges of the sides of the channel-rim B and inclosing the chamber C is a rubber-tire D. This portion D comprises the annular shoe E of hard rubber (preferably composed of composition, such as is now commonly used for shoes of pneumatic tires) and a lower elastic portion F having annular elastic lateral flanges G forming a band, the edges of which are clamped firmly to the sides of the channel-rim B.

As shown, the shoe-portion E narrows adjacent to the portion F to increase the available width of the elastic flanges G. Preferably these flanges terminate in beaded edges H, which are received in grooves J in the outer edges of the sides of the channel-rim B and are clamped therein by annular clamping rings K held in place by screws L.

The channel-rim is provided with a series of transverse ribs $B^2$ spanning the annular chamber C, and the shoe-portion is provided with a series of transverse pockets $E^2$ located, when the shoe is applied, above the ribs $B^2$ with the elastic web-portion F at each pocket extending over the corresponding rib. As the shoe is compressed in action these webs are forced down upon the adjacent ribs.

In the form shown in Figs. 1 and 2, the ribs $B^2$ are integral with the rim-portion B and extend to the full depth of the channel-opening C; in the constructions shown in Figs. 3, 4, 5, 6 and 7, however, these ribs are formed on an annular ring M, the annular edge N N of which are supported upon the inner edges O O of the channel-rim B under the elastic flanges G G. In these cases, the ribs $B^2$ are formed by transverse portions between the outer annular portions; and in the form shown in Figs. 6 and 7 these ribs $B^2$ are connected by longitudinal portions $B^3$ parallel to the outer edges and forming, in effect, a longitudinal rib.

The tread E and the flanges G G with their connecting portion F may be made separate and secured together or they may be made in one integral piece.

A strip S of canvas or equivalent material may be introduced in the tread E with its side edges T T extending laterally about the flanges G G and clamped with the flanges between the channel B and clamping rings K. This canvas protects the elastic flanges and prevents gravel, dirt, and foreign matter from lodging in the joint between the flanges and clamping ring. It also helps to support the tread portion laterally.

When the elastic web F is pressed upon the adjacent transverse rib B², two additional points of stretching are provided at each rib, and as these ribs are many in number and are arranged throughout the circumference of the rim-portion, the tire will have greatly increased elasticity and sustaining power. This is increased in the form shown in Figs. 6 and 7, where in addition to the effect of the transverse ribs B² there is also the effect of the longitudinal rib B³. In this case the shoe-portion is formed with corresponding connecting longitudinal pockets E³ between the transverse pockets E². This form is especially adapted for broad tires and heavy loads.

A puncture of the flanges G will not materially affect the efficiency of the tire but should any injury occur, of such character as to require the replacement of the rubber portion, it can readily be accomplished by detaching the clamping rings K.

Having now described my invention what I claim as new and desire to secure by Letters Patent is:—

1. In a wheel-tire, the combination of a metal channel-shaped rim structure providing parallel circumferential side walls, and an intermediate portion having a plurality of transverse rib portions extending from the side walls, combined with a shoe-portion having a plurality of transverse pockets adjacent to the under side, closed at said bottom by an elastic web having laterally extending continuous sides extending to and secured to the circumferential edges of the side walls of the rim structure, and in which the pockets are arranged above the transverse rib portions, and in which the transverse width of the shoe-portion adjacent to the elastic web is greatly less than the width between the side walls of the rim structure.

2. In a wheel-tire, the combination of a metal channel-shaped rim structure providing parallel circumferential side walls, and an intermediate portion having a plurality of transverse rib portions extending from the side walls, combined with a shoe-portion having a plurality of transverse pockets adjacent to the under side, closed at said bottom by an elastic web having laterally extending continuous sides extending to and secured to the circumferential edges of the side walls of the rim structure, and in which the pockets are arranged above the transverse rib portions, and in which the transverse width of the shoe-portion adjacent to the elastic web is greatly less than the width between the side walls of the rim structure, and in which further the shoe-portion is provided on each side with canvas portions extending radially inward and united to the circumferential edges of the side walls of the rim structure so as to close the lateral openings of the pockets of the shoe-portion and also thread the elastic web.

3. In a wheel-tire, the combination of a shoe-portion having a series of transverse pockets adjacent to the inner side closed by an elastic web-portion, and a channel-shaped rim-portion supporting said shoe-portion and provided with a series of transverse ribs extending across and of less depth than said channel-portion adjacent to the elastic web-portions over the pockets in the shoe and adapted to successively receive the contact of said web-portions as pressure is applied to the shoe during rotation, and the side edges of the elastic web portion secured to the sides of the rim-portion.

4. In a wheel-tire, the combination of a shoe-portion having a series of transverse pockets adjacent to the inner side closed by an elastic web-portion, a rim-portion supporting said shoe-portion, and a ring carried by said rim-portion and having a series of transverse ribs adjacent to the elastic web-portions extending over the pockets in the shoe-portion, and adapted to successively receive the contact of said web-portions as pressure is applied to the shoe during rotation.

5. In a wheel-tire, the combination of a shoe-portion having a series of transverse pockets adjacent to the inner side closed by an elastic web-portion, a rim-portion supporting said shoe-portion and having outwardly extending sides, and a ring supported by the sides of said rim-portion and having a series of transverse ribs adjacent to the elastic web-portions extending over the pockets in the shoe-portion, and adapted to successively receive the contact of said web-portions as pressure is applied to the shoe during rotation.

6. In a wheel-tire, a shoe-portion consisting of a relatively hard rubber annular tread structure having a series of transversely arranged recesses or pockets adjacent to the under side and providing between them inwardly projecting walls, and said inner side closed by a thin and very elastic web secured integrally to the under surface of the inwardly projecting walls and providing wide lateral elastic circumferential portions projecting greatly to each side of the tread portion of the shoe.

7. In a wheel-tire, a shoe-portion consisting of a relatively hard rubber annular tread structure having a series of transversely arranged recesses or pockets adjacent to the under side and providing between them inwardly projecting walls, and said inner side closed by a thin and very elastic web secured integrally to the under surface of the inwardly projecting walls and providing wide lateral elastic circumferential portions projecting greatly to each side of the tread portion of the shoe, and a textile band integrally connected through the outer portion of the shoe and providing lateral, flexible, circumferential webs on the sides of the shoe and extending to the lateral edges of the lateral elastic circumferential portions.

8. In a wheel-tire, a shoe-portion consisting of a relatively hard rubber annular structure having a series of transversely arranged recesses or pockets adjacent to the under side and providing between them inwardly projecting walls, and said inner side closed by an elastic web secured integrally to the under surface of the inwardly projecting walls and providing lateral elastic circumferential portions projecting to each side of the shoe, a textile band integrally connected through the outer portion of the shoe and providing lateral, flexible, circumferential webs on the sides of the shoe and extending to the lateral edges of the lateral elastic circumferential portions, and a rim structure for supporting the shoe portion having two circumferential side walls connected by transverse portions arranged under the pockets of the shoe and provided with means for attachment of the lateral edges of the elastic web and textile webs to the circumferential edges of its side walls.

9. A shoe-portion of a wheel-tire consisting of a shoe proper having a series of separated transversely arranged pockets adjacent to the under side and closed by elastic web-portions and having elastic flanges extending from its sides, and a strip of textile material extending through the shoe proper and projecting at the sides, in combination with a rim-portion supporting said shoe-portion and having a series of transverse ribs adjacent to the elastic web-portions of the shoe, and in which the elastic flanges of the web and the projecting edges of the textile material are secured to the sides of the rim-portion.

10. In a wheel-tire, the combination of a shoe-portion having a pocket adjacent to the under side closed by an elastic web, and a rim-portion supporting said shoe-portion and having a recessed face provided with ribs extending both transversely and longitudinally across it adjacent to the face of the elastic web closing the pocket in the shoe and adapted to receive the contact of said web when pressure is applied to the adjacent part of the shoe-tread.

In testimony of which invention, I hereunto set my hand.

CHARLES HAHN GENTH.

Witnesses:
R. M. KELLY,
E. N. BARLOW.